June 30, 1970  R. M. ANDERSON  3,518,033
EXTRACORPOREAL HEART
Filed Aug. 22, 1969  6 Sheets-Sheet 1
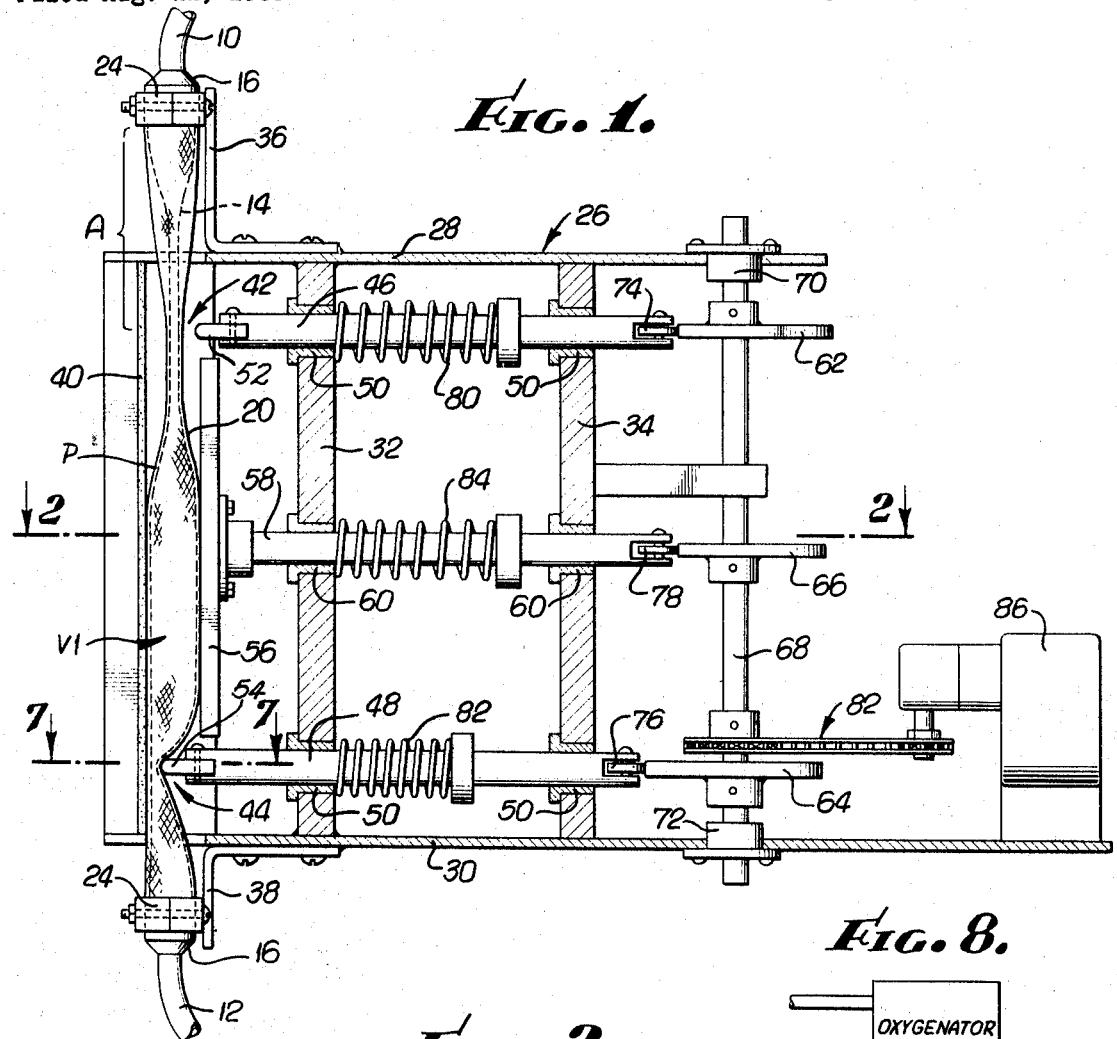
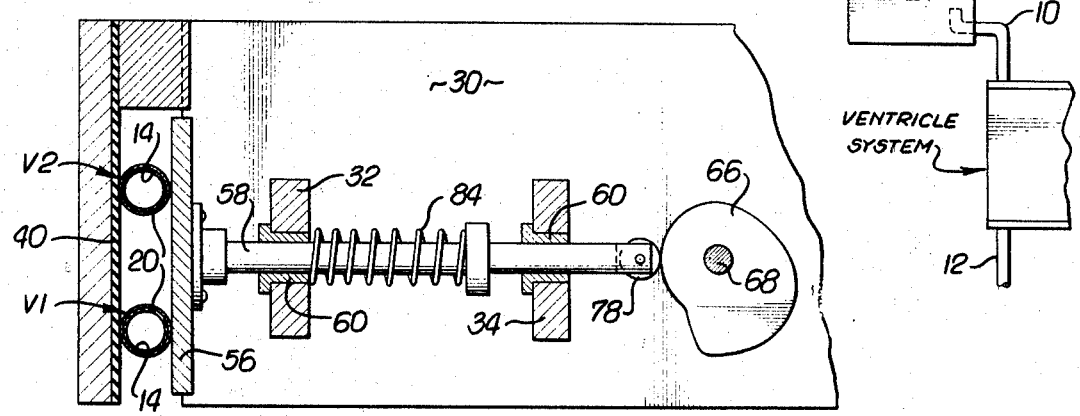
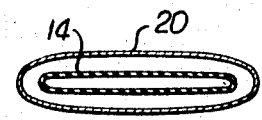
INVENTOR.
ROBERT M. ANDERSON
BY
Flam and Flam
ATTORNEYS.

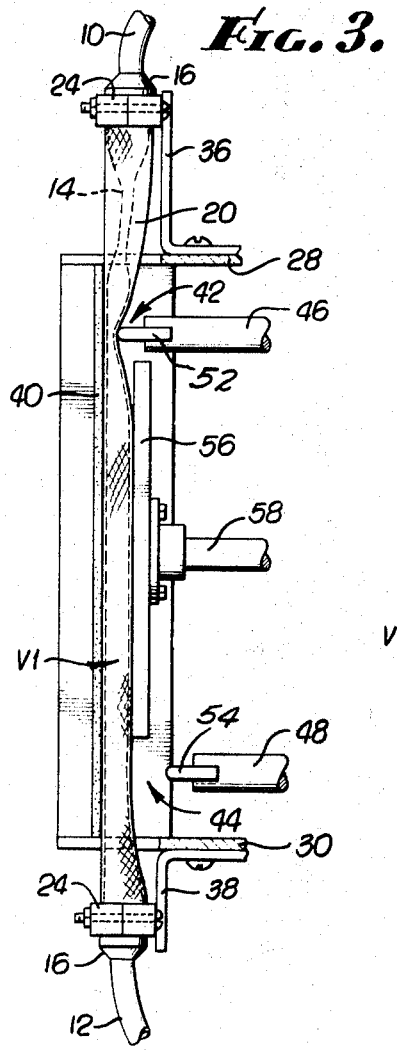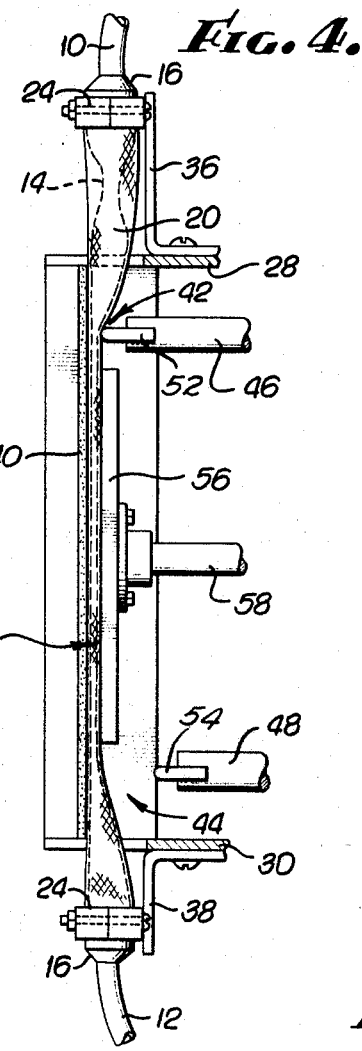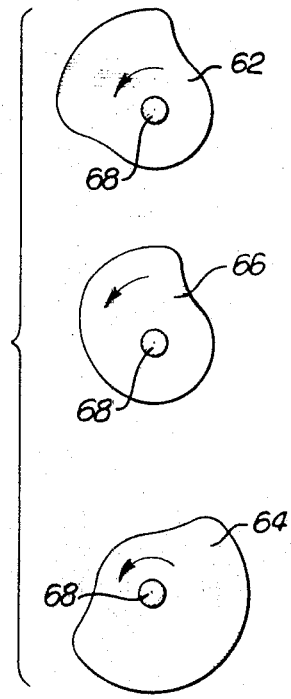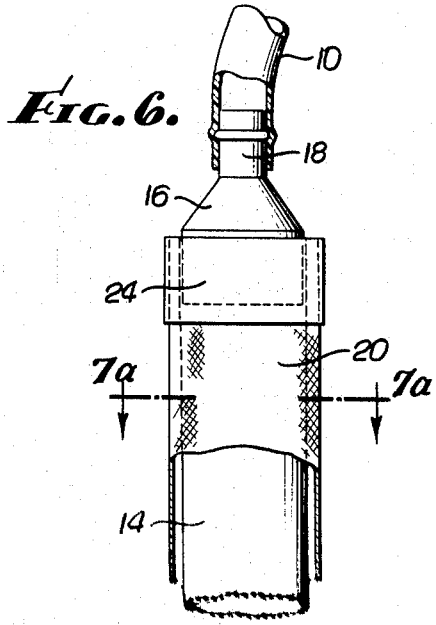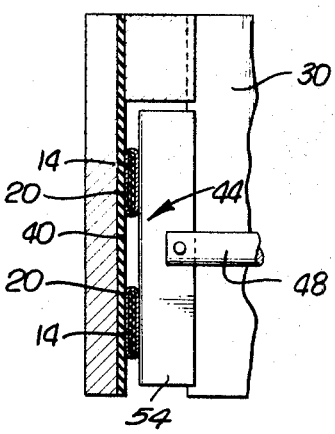

June 30, 1970  R. M. ANDERSON  3,518,033
EXTRACORPOREAL HEART
Filed Aug. 22, 1969  6 Sheets-Sheet 4
FIG. 12
FIG. 13
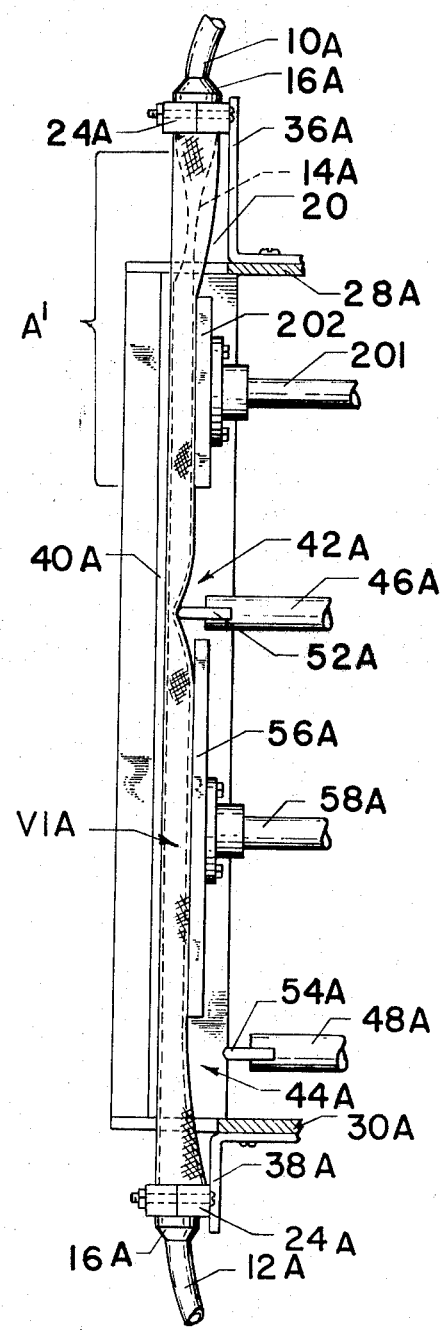
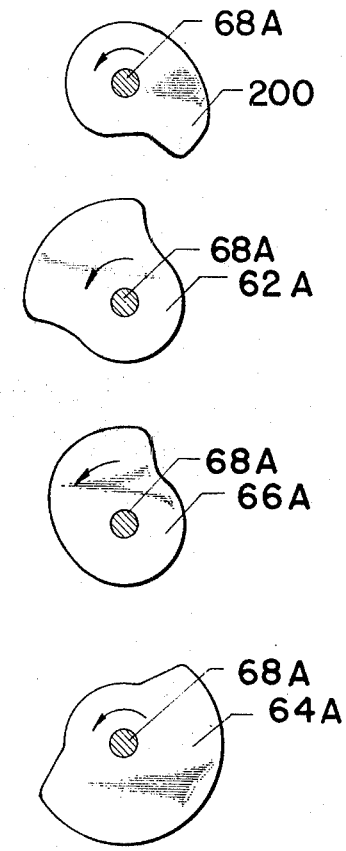
INVENTOR.
ROBERT M. ANDERSON
BY
William C. Nealon
ATTORNEY

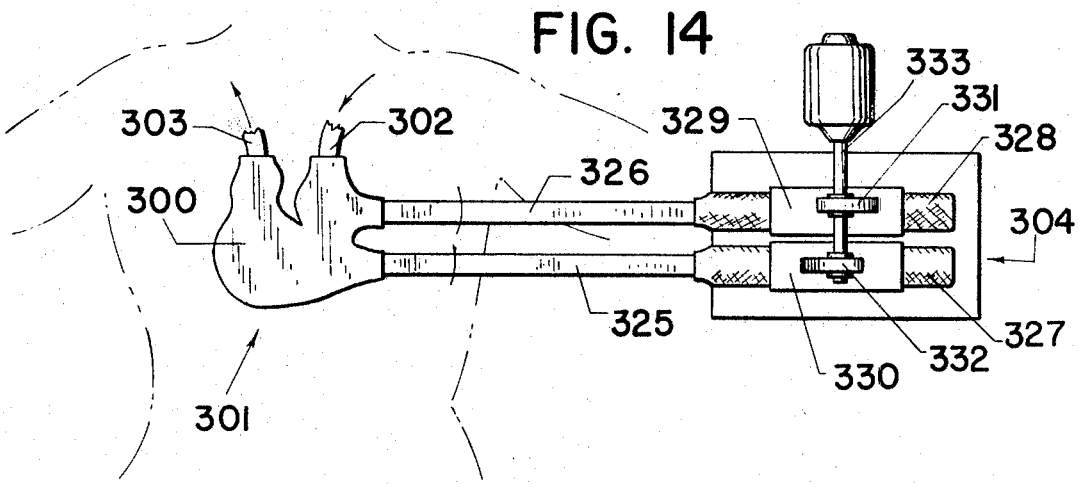
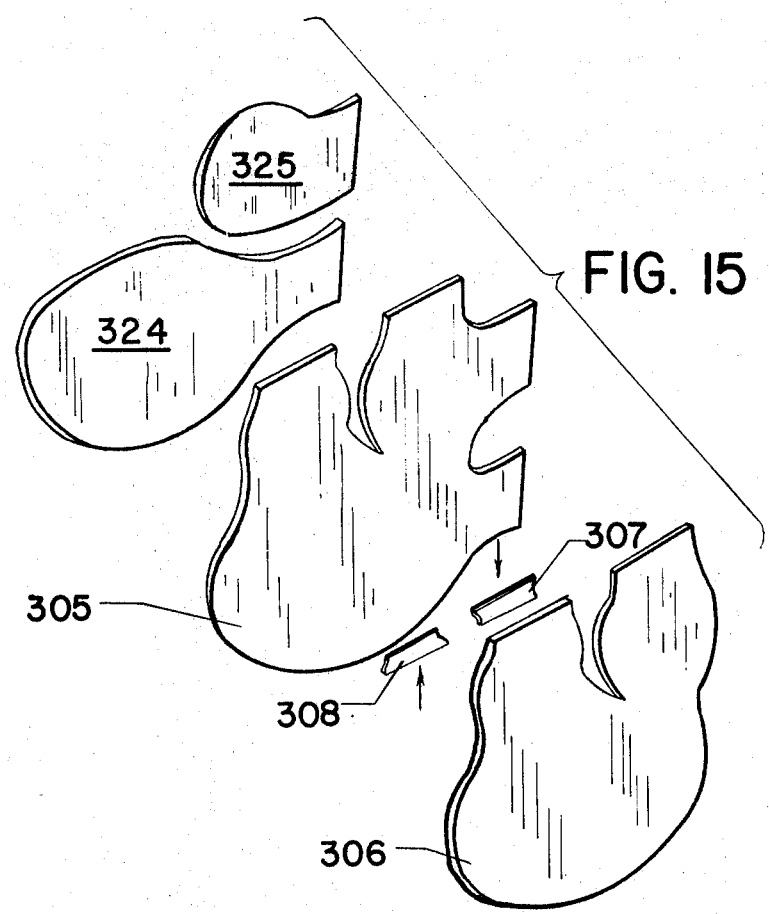

INVENTOR.
ROBERT M. ANDERSON
ATTORNEY

United States Patent Office 3,518,033
Patented June 30, 1970

3,518,033
EXTRACORPOREAL HEART
Robert M. Anderson, 4625 E. San Carlos Place,
Tucson, Ariz. 85716
Continuation-in-part of application Ser. No. 597,330,
Nov. 28, 1966. This application Aug. 22, 1969,
Ser. No. 860,146
Int. Cl. A61m 1/03; F04b 43/08
U.S. Cl. 417—478                    15 Claims

ABSTRACT OF THE DISCLOSURE

A non-sucking pulsatile outflow continuous inflow pump arranged for use with a human body as an artificial ventricle. The pump consists of a first distensible body forming a chamber which is flat in cross-section when the body is in repose. This first body serves as a ventricle chamber. There is means forming an inlet and an outlet to the chamber. The inlet interconnects the ventricle with an atrium. The atrium is comprised of an additional distensible body similar to the first one. Valves, and impellers are associated with the ventricle and atrium chambers arranged for synchronous operation of said valves and impellers to produce a pulsatile discharge from the ventricle outlet and a continuous unrestricted inflow of blood, or liquid, to the atrium.

BACKGROUND

This is a continuation-in-part of Ser. No. 597,330, filed Nov. 28, 1966, now abandoned.

This invention relates to an extracorporeal or artificial ventricle system to replace at least temporarily the corporeal heart or to supplement its impaired functions.

Various attempts have been made to provide a satisfactory extracorporeal heart. The known devices most reasonably successful have significant disadvantages. For example, upon any change in the flow characteristics of the vascular system, immediate adjustment must be made in the pump characteristics of the artificial heart. The reason is that the artificial heart affects the vascular flow, and a complex, virtually uncontrollable, feedback relation exists between the artificial heart and the vascular system of the subject. During open heart surgery, for example, a technician is substantially continually instructed by the surgeon as to starting, stopping, and adjustment of pump operations. A difficult, coordinated effort is required; continuous monitoring is necessary; yet the physiological needs of the subject are not necessarily satisfied. Intricate feedback mechanisms have been devised, but they have not proved completely successful.

OBJECT OF THE INVENTION

The primary object of this invention is to provide an extracorporeal ventricle that requires only two bypass connections to the patient without any sensing devices or feedback mechanisms at all, and that can be used without any attention or monitoring on the part of the surgeon. A reliable device is thus provided that frees the surgeon for surgical tasks.

Another object of this invention is to provide an artificial ventricle system which by virtue of its simplicity, functional capabilities and freedom of monitoring, is capable of use as a semi-permanent hear replacement. Another object of this invention is to provide a simple artificial heart that operates on stand-by relationship and automatically performs heart functions when, as and if necessary.

Another object of this invention is to provide artificial ventricles capable of efficient non-monitored operation with an artificial lung. In order to achieve this operation, the artificial lung is simply interposed in the venous return, and the output of the artificial lung, whatsoever it may be, is coupled to the atrium, as by an overflow system.

In order to accomplish the foregoing objects, a ventricle system is provided that works in essentially the identical manner as a human heart, and that is responsive to all of the essential physiological requirements of the human vascular system. Applicant's improved ventricle system is made possible by virtue of a new view of the functions of the heart. A healthy heart with a pulsing action simply recirculates the volume of blood that reaches it; it does not in any way affect the quantity of blood flow. The pulsatile blood flow has been shown to be essential in order to disperse blood through all vessels despite impedance variations among parallel branches.

Most artificial hearts provide pulsatile flow. However, in one way or another, they all undesirably affect the flow characteristics of the vascular system. This they do by imposing a suction at the ventricle inlet and/or by interrupting the venous flow to the ventricle periodically with the pulsations of the outlet. Obviously, the imposition of suction on the veonus system will affect vascular flow. However, it is more difficult to appreciate that a pulsating heart in no way stops the venous flow even though the flow in the ventricle itself is intermittent. Further, just ahead of the ventricle inlet valve is the atrium or auricle that slightly contracts immediately in advance of the closure of the ventricle inlet valve.

A number of authorities have assumed that the atrium assists in filling the heart chamber. For example, Webster's New International Dictionary, Second Edition, under "heart," reports: "The two atria contract and force the blood (which they receive from the veins) into the ventricles." In applicant's studied opinion, the atrium, while it may incidentally force blood into the ventricle, has an altogether different function: it serves as a flow-regulating tank that expands to receive the venous flow while the ventricle inlet valve is closed, thus allowing the venous flow to continue uninterruptedly. When the ventricle inlet valve opens, the gorged atrium disgorges, and the slight muscular contraction in advance of valve closure ensures sufficient collapse of the atrium to permit unrestricted venous inflow to the atrium during the succeeding ventricle beat. Thus, the remarkable combined heart operation is characterized by pulsatile outflow with steady inflow and absence of any inlet suction, the inflow being a function of vascular conditions quite independent of the heart action.

Because many known artificial hearts fail to provide a distensible tank or chamber ahead of the ventricle, they necessarily interrupt venous flow with consequent complications. Other known artificial hearts utilize resilient walls for the ventricle chamber. These walls spring back after they are collapsed; consequently, a diastolic suction is applied to the venous system with resultant complications.

An object of applicant's invention is to provide a non-sucking artificial heart system. This is accomplished by the ventricle having a flat cross-section when not distended. It is provided with a distensible chamber or atrium so arranged as to discharge sufficiently to allow unrestricted venous inflow. By judiciously locating the atrium at an elevated position relative to the subject, the atrium requires no timed constricting mechanism.

Another object of this invention is to provide artificial ventricles that without adjustment automatically maintain volumetric balance between the systemic and pulmonary circuits, thus avoiding edema or hypoxia common in other types of artificial hearts. The non-sucking nature of the ventricles causes this automatic balancing.

This invention possesses many other advantages and has other objects which may be made more clearly apparent from a consideration of one embodiment of the invention. For this purpose, there is shown a form in the drawings accompanying and forming a part of the present specification, and which drawings, unless described as diagrammatic, or unless as otherwise indicated, are true scale. This form will now be described in detail, illustrating the general principles of the invention; but it is to be understood that this detailed description is not to be taken in a limiting sense, since the scope of this invention is best defined by the appended claims.

THE DRAWINGS

FIG. 1 is a vertical sectional view of an extracorporeal heart incorporating the present invention;

FIG. 2 is a sectional view taken along the plane corresponding to line 2—2 of FIG. 1;

FIGS. 3 and 4 are fragmentary sectional views and show a portion of the apparatus in FIG. 1, illustrating the apparatus at different portions of the cycle;

Figure 9:
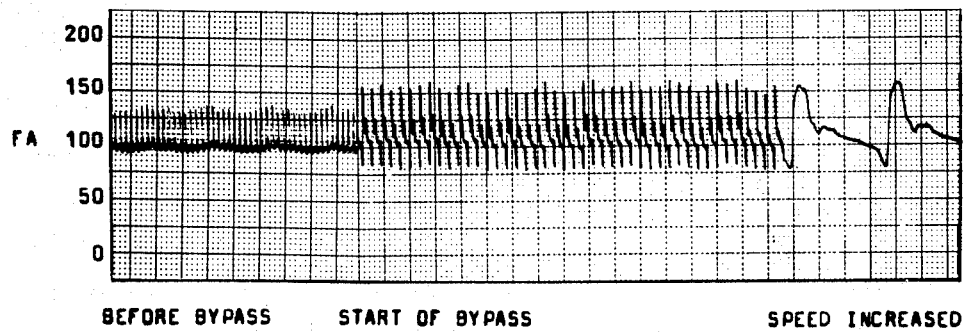
Figure 10:
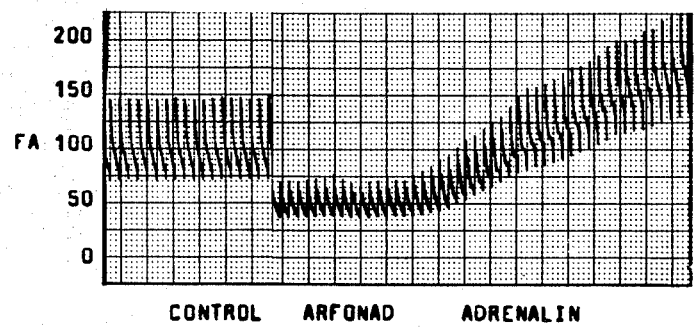
Figure 11:
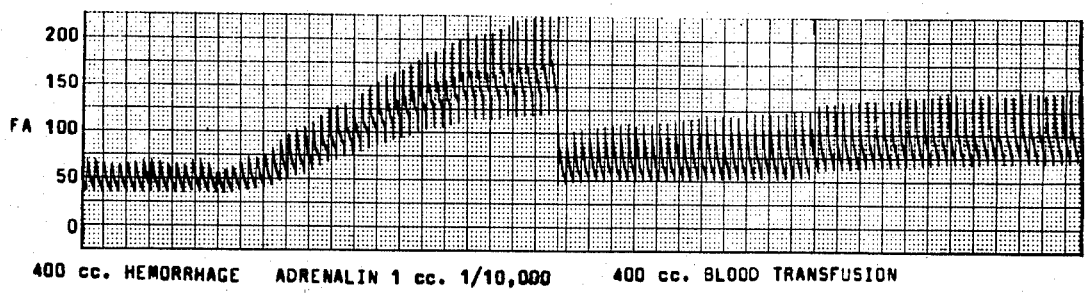
Figure 16:
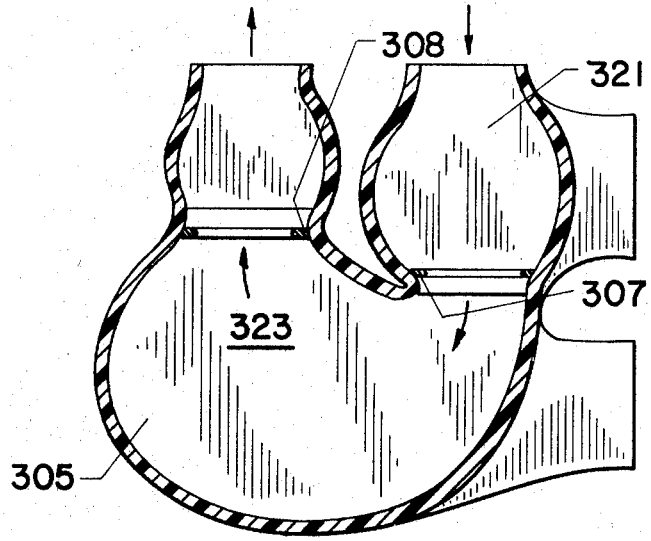
Figure 17:
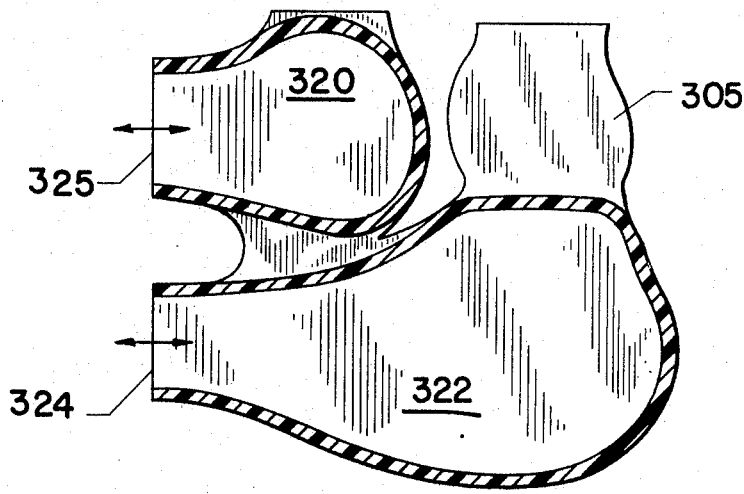

FIG. 5 diagrammatically illustrates the cams for the ventricle parts;

FIG. 6 is an enlarged fragmentary view, partly in section, showing part of the apparatus of FIG. 1;

FIG. 7 is a sectional view taken along the plane corresponding to line 7—7 of FIG. 1;

FIG. 7a is an enlarged sectional view taken along a plane corresponding to line 7a—7a of FIG. 6;

FIG. 8 is a diagrammatic view illustrating the use of the ventricle in combination with a lung device;

FIGS. 9, 10 and 11 are blood pressure tracings;

FIG. 12 is a fragmentary sectional view of an alternative arrangement of apparatus of the type shown in FIG. 1 illustrating an embodiment including an atrium impeller;

FIG. 13 diagrammatically illustrates the cams used for operating certain elements of FIG. 12;

FIG. 14 is an exemplary schematic illustration of the use of the principles of this invention with an implantable artificial heart;

FIG. 15 is an exploded view schematically indicating the elements utilized in fabricating the artificial heart of FIG. 14; and FIGS. 16 and 17 are sectional views of internal chambers of the artificial heart of FIGS. 14 and 15.

DETAILED DESCRIPTION OF THE INVENTION

If the lungs of the subject are to be used for oxygenation of the blood, four bypass connections must be surgically provided—two for the right ventricle and two for the left ventricle. In the event that an external oxygenator is to be used, only two bypass connections need be established, namely to the aorta and to the vena cava. In the drawings, two ventricles V1 and V2 (see, also, FIGS. 2 and 7) are illustrated in side-by-side relationship. The ventricles are identical, and a description of one will suffice as a description of the other.

Ventricle V1 for example, bypasses the left ventricle of the heart by the aid of tubing 10 and 12. The tubing 10 and 12 connects with suitable cannulae surgically inserted in the vessels adjacent to the heart. A thin-walled, highly flexible, normally flat-rubber tube 14 (FIG. 7a) is connected between the tubing 10 and 12. For this purpose, fittings 16 are provided at the ends of the tube 14. Each fitting has a small diameter nipple 18 at one end, over which the end of the tubing 10 and 12 is forcibly fitted. The other end of the fitting 16 has a large diameter circular end, over which the corresponding end of the ventricle tube 14 is fitted. Surrounding the ventricle tube 14, for purposes of reenforcement, is a cloth sleeve 20 corresponding in length to that of the ventricle 14. The cloth may be made of suitable strong material such as plastic, canvas, or the like and is also normally of flat cross-section. The ends of the sleeve 20 and the ends of the ventricle tube 14 are secured to the fittings 16 by clamps 24.

The ventricle is supported by a frame structure 26 comprising upper and lower plates 28 and 30 and transverse bearing brackets 32 and 34. The clamp structures 24 are secured to brackets 36 and 38 respectively attached to the outer sides of the upper and lower plates 28 and 30. The ventricle is thus supported so that it extends across one end of the frame. The ventricle extends along a backing plate 40, and is oriented so that the side edges of the ventricle tube 14 are disposed laterally of the plate 40 as shown in FIGS. 2 and 7. The ventricle is vertically oriented so that gravity defines a normal fluid flow through the ventricle.

Two valve structures 42 and 44, spaced along the ventricle, control the flow of blood relative to a ventricle chamber extending between the valves. Valve closure is accomplished by pinching the ventricle against the backing plate 40. For this purpose two push rods 46 and 48 are provided that are mounted for reciprocating movement toward and away from the ventricle and the backing plate 40. The rods 46 and 48 are supported by the bearing blocks 32 and 34 in bearing bushings 50 with their ends projecting forwardly of the bearing block of 32. Carried at the ends of the push rods 46 and 48 are transverse pressure bars 52 and 54 (see, also, FIG. 7). The forward ends of the pressure bars 52 and 54 are preferably rounded.

By advancing the push rod 46, the ventricle is clamped against the plate 40, and flow to the ventricle chamber is interrupted. Similarly, by advancing the push rod 48, flow from the ventricle chamber is interrupted.

In order to pump blood from the ventricle chamber, a pump plate 56 is provided. The pump plate is mounted for reciprocating movement at the end of a third push rod 58 likewise mounted by the bearing brackets 32 and 34 as by bearing bushings 60. When the pump plate advances, fluid in the ventricle chamber is forced out through the open valve 44.

The push rods 46, 48 and 58 are timed so as to produce a unidirectional pulsatile flow between the conduits 10 and 12. In the position shown in FIG. 1, the valve 44 is closed, the pumping plate 56 is retracted, and the valve 42 is open. The ventricle chamber is partially distended and filled to a point P. Next, as shown in FIG. 3, the valve 42 closes and the valve 44 opens as the pump plate approaches the ventricle. Next, as shown in FIG. 4, the pumping plate 56 advances and forces blood into the conduit 12. Finally, the valve 44 closes as the valve 42 opens, and the pumping plate 56 retracts as shown in FIG. 1. The cycle accordingly is repeated.

In order to perform these synchronized movements of the push rods 46, 48 and 50, a cam structure is provided. Cams 62, 64 and 66 are mounted upon a cam shaft 68, in turn supported by bearings 70 and 72 attached to the upper and lower frame plates 28 and 30. The cams 62, 64 and 66 cooperate with follower rollers 74, 76, and 78 secured to the ends of the push rods 46, 48 and 58 remote from the ventricle. Springs 80, 82 and 84 urge the rods in a direction to cause the follower rollers 74, 76 and 78 to remain in engagement with their cams 62, 64 and 66.

In order to rotate the cams shaft 68 at a suitable pulsatile rate of, say 80 revolutions per minute, a variable speed motor-transmission 86 is provided. A sprocket mechanism 82 connects the drive to the cam shaft.

That portion of the ventricle located above the valve 42 forms a chamber or atrium A to allow the continuous inflow of blood thereto whereby no restriction is placed upon the vascular system of the subject. Thus, in the position illustrated in FIG. 1, the atrium A is partially emptied and most of the blood has flowed into the ventricle chamber to the point P. When the valve 42 closes, the atrium A becomes distended as it continuously receives the inflow of blood from the conduit 10, and is indicated in FIGS. 3 and 4. As soon as the valve 42 opens, most of the blood in the atrium A drops to the ventricle chamber. At the same time, blood flowing from tubing 10 also passes to the ventricle chamber. Accordingly, there is no restriction whatsoever placed upon the continuous venous flow. At the same time, since the ventricle system is fully flexible, it imposes no diastolic suction on the vascular system. That is, the ventricle chamber, when filled with blood, distends without the generation of tensive reactive forces in the chamber walls. The cloth or canvas cover 20 is further assurance that such forces are not generated. Pulsatile outflow is nevertheless provided by virtue of the sequence operation of the valves 40, 44, and the pumping plate 56.

The companion ventricle V2, for purposes of convenience, is operated by the same pumping plate 56 and the push rod structures, the lateral extent of the pumping plate 56 and the pressure bars being adequate for this purpose and being indicated generally in FIGS. 2 and 7.

With the cannulae clamped preparatory to bypass operation of the ventricle, the motor 86 can be started. Just as soon as the cannulae clamps are released, the ventrical system begins operation for whatever flow is received.

The ventricles V1 and V2 are designed to have a maximum capacity more than adequate to receive venous flow. If the venous flow is large, the level of blood in the ventricle at P may rise. Nevertheless, the entire volume will be displaced by operation of the pump. If the venous flow is less, the point P will fall, and it too will be dispaced. No volumetric adjustments need be made.

When using the ventricle system in combination with an oxygenator, as shown in FIG. 8, the tube 10 is simply installed in the oxygenator at a point to receive the overflow therefrom. Accordingly, the entire system operates as a self-adjusting system. The ventricle is placed at a suitable level to avoid hydraulic imbalances relative to the subject.

Experiments were performed on twenty-seven mongrel dogs. In fifteen dogs, both left and right sides of their hearts were by passed with non-sucking ventricles placed in the pulsatile pump. The dogs' own lungs were thus used for oxygenation. The heart was exposed through a median sternotomy. Tubing of 3/8" internal diameter drained blood from each atria to its respective pump. Infusion from the two pumps was through 1/4" internal diameter tubing to the pulmonary artery and aorta cannulae. The pump inlets were placed at the level of the inferior aspect of the atria in order to have the prosthesis in the same hydrostatic position as the dogs' own heart. Bypass was established by turning on the pump, unclamping the venous drainage tubes, and then fibrillating the heart. Termination of bypass was by defibrillating the heart, clamping the atrial cannulae, and then turning off the pumps. Bypass periods up to fourteen hours were maintained. No adjustment or regulation of the pump rate was made at any time.

Eleven other dogs were put on cardio-pulmonary bypass using gravity drainage to a bubble oxygenator and a pump with a single ventricle. The inlet of the ventricle was placed at the desired level of blood in the oxygenator. Bypass was utilized for periods up to two hours. No pump adjustments or regulations were made.

Fifteen dogs placed on cardiac bypass with two pulsatile non-sucking pumps with atria were observed to maintain normal mean arterial blood pressure and to react in a normal way to stimuli which normally causes alterations in blood pressure and circulatory rate. They also maintain normal blood volume balance between the systemic and pulmonary circuits. This duplication of cardiac action occurred without any pump adjustments being made.

FIGS. 9, 10 and 11 are typical tracings. FIG. 9 shows the arterial blood pressure after onset of bypass with the same mean pressure being maintained as before bypass. The systolic pressure on bypass is higher and the diastolic lower because the pump rate is slower than the heart rate had been before bypass. The pump, being slower, has a greater stroke output at the same flow rate. FIG. 10 shows the decrease in arterial blood pressure while on bypass following 400 cc. hemorrhage, in turn followed by blood pressure increase after administration o of epinehrine. The epinephrine effect wore off in approximately five minutes. The resulting hypotension was then gradually corrected by replacing the 400 cc. of blood. FIG. 11 shows the blood pressure effect in the same animal to Arfonad while on bypass. Six minutes after hypotension from Arfonad, epinehrine again increased the blood pressure. These changes in arterial blood pressure parallel, in each instance, changes in blood flow rate as observed by the amount of diastolic distention of the pump ventricles. All the changes demonstrated here were independent of the pump, as it was not adjusted but was passive and pumped out whatever came to it.

Blood volume balance between the pulmonary and systematic circuits was maintained at all times in every case without any need for pump adjustment. This was evident, as no pulmonary edema or hypoxia developed, as occurs so easily with sucking pump systems. To demonstrate the effectiveness of this non-sucking pumping system in preventing pulmonary edema from imbalance of the two pumps, the following experiment was done during two of the procedures:

Blood was removed from the aorta and injected into the pulmonary artery in increments of 25 cc., until an amount equal to more than the entire blood volume had been exchanged over a ten-minute period. This caused no change in compliance and no pulmonary edema or evidence of any imbalance in the volumes between the two systems. The distensibility and resistance of the two systems determined the blood volume balance between them. For example, if the pulmonary and systemic circuits are in equilibrium, there is essentially equal right and left output. If for any reason there is a shift of blood from the systemic circuit to the pulmonary compartment, the means systemic pressure would fall and the mean pulmonary pressure would rise. This would cause a slowing down of blood returning to the right heart and a speeding up of blood coming to the left heart. As both pumps put out whatever comes to them, the left ventricular output then exceeds the right until the old equilibrium is again established. This is simply hydraulic cause and effect and is not dependent on any reflex or adjustment when non-sucking pumps are used.

This explains why in intact circulatory systems there can be loss of fluid by water loss in exhaled air, gain of fluid from the gastrointestinal tract, addition of blood by transfusion to the system circuit, and large left-to-right or right-to-left shunts with no imbalancing of the volume equilibrium between the two circuits.

By contrast, pumps which suck at their inlets have their output determined by their rate so that constant right and left pump rate alterations are necessary to maintain blood volume balance. Any inequality in pumping rate or stroke volume of the two pumps progressively drains one compartment and over-distends the other. Also, addition or subtraction of fluid from a compartment or a shunt is not followed by an automatic shift to or from the other compartment, so that no restoration of equilibrium occurs.

This contrasts with prior art attempts to bypass the heart with two sucking pumps which require complicated sensing devices and controls and which still have proved deficient in satisfactory volume equilibrium control. With non-sucking heart replacement pumps, the normal volume equilibrating mechanism between the pulmonary and systemic circuits is a function of the vascular bed, and is done automatically with no pump regulation.

The fifteen dogs in this group had cardiac replacements with perfusions as long as fourteen hours. Experience with pumping parallel with the left ventricle was obtained during the course of these studies. Also, short periods of perfusion with left ventricular bypass alone were utilized prior to going on complete heart bypass. There was no alternation in normal blood flow in these situations, as whatever blood didn't go to the left ventricle was automatically pumped by the mechanical pumps and vice versa.

The second group of dogs, using a single pump and a Travenol oxygenator primed with blood, demonstrated all the responses seen above with two pumps. The non-sucking pump without regulation would maintain a constant level of blood in the oxygenator at the level of the pump inlet. This eliminated any hazard of pumping bubbles or running out of blood in the oxygenator. Here again, any change in blood volume in the animal, or vascular tone change due to vasopressors or dilators, was reflected in a corresponding change in circulatory rate and arterial blood pressure. Blood loss resulted in low arterial blood pressure and low blood flow rate, as shown by decrease in ventricular filling and the smaller size of the blood stream in the oxygenator helix. Replacement of blood caused restoration of circulatory rate and arterial blood pressure. Vasopressors caused increased flow rate and elevated arterial blood pressure. The converse was true with Arfonad.

This pump setup with an oxygenator allowed normal circulation and circulatory responses to physiologic stimuli without need for controls.

The one experience with right heart bypass alone demonstrated a serious hazard to such a procedure. After one-half hour of pumping, manipulation of the heart caused ventricular fibrillation. The replacement pump continued its output, but the left heart, in arrest, did not. Thus, the lugs were quickly damaged beyond recovery by a large shift of blood from the systematic circuit.

In contrast to the above, incidental ventricular fibrillation is not such a hazard with left heart bypass, as the systemic circuit can accommodate any shift of blood volume from the lungs.

FIGS. 12 and 13 are schematically indicative of an alternative pump construction utilizing the basic concepts of my invention but further including an impeller for the atrium A'. Since the structure is in all other respects similar to that of FIGS. 1 through 5 and especially FIGS. 3 and 5, I have used like reference numerals with the letter A as a suffix. Since the operation of these elements is in all respects similar to the comparable elements in FIGS. 1 through 5, the description thereof is not repeated here in order to maintain simplicity in description of the invention.

The added elements in FIGS. 12 and 13 include a cam 200 on the common cam shaft 68A arranged to move synchronously the atrium impeller 202 through its associated push rod 201. The cam 200 is so formed that the impeller 202 is retracted just before the inlet valve 42A is closed. This is necessary since if it let go or retracted after closure of the valve 42A, there would be undesirable back pressure and thus interruption of the continuous inflow of blood to the atrium. The motion of the impeller 202 must be incomplete of a full collapse or closure of the atrium A' since there must be no obstruction of blood inflow. The cams of FIG. 13 are substantially to scale indicating a practical arrangement for the operation of the machine. It should be noted the atrium A' is somewhat larger than the atrium A of the earlier figures. This is to further insure that the impeller 202 may move and impel blood into the ventricle without in any way impeding the venous flow of blood. The foregoing arrangement assures the necessary partial emptying of the atrium when the inlet 42A is open, even if the pump is in other than an upright position.

In the embodiments described in the foregoing discussion I have indicated it is desirable that the atrium and ventricle chambers be of a highly flexible material. This is not, however, always necessary. It is however, essential that the cross-section of the rubber tube 14 or 14A or its equivalent be substantially flat in cross-section when in repose as, for example, shown in FIG. 7A; or in some other configuration or construction which will not allow tensive forces to be generated in the walls thereof during usage. The flat configuration especially lends itself to distension without inducing any tensive forces in the walls of the tube 14 or 14A. A tube which is of circular configuration when in repose by contrast tends by its very nature to return to a circular configuration if it has been collapsed as, for example, by the action of an impeller.

The operation of a pump according to my invention is dependent not on pump rate (within the maximum limits of the pump, of course). Rather its outflow is a function of mean vascular pressure. In the normal human being mean vascular pressure is usually between 16–18 millimeters of mercury. One can express the relationship empirically as follows:

$$\text{Blood flow} = \int \frac{MVP}{PR}$$

wherein MVP is mean vascular pressure and PR is the inherent peripheral resistance of veins, capillaries, and arteries to the flow of blood therethrough. Thus, the pump of this invention is entirely passive in nature. Mean vascular pressure can also be defined as that pressure which can be measured when the heart is stopped and pressure is equalized all through the vascular system. It can be defined as the indirect vascular pressure independent of heart pump action, flow, etc.

Pumps of the type described above have now been used in over 100 human operations, in some cases as a booster in parallel with the heart. The pumps have operated from 17 minutes to 3 hours in these operations.

Broadly, the principles of my invention are not limited to systems wholly exterior of the body. My discovery of the non-sucking, passive nature of the heart is equally applicable to an implantable artificial ventricle. An exemplary arrangement is shown in FIGS. 14–16. In FIG. 14 the implantable artificial ventricle 300 is shown implanted in the chest cavity 301. The atrium inlet is shown schematically interconnected with the vena cava 302 and the ventricle with the aorta 303. Operations of the ventricle 300 is controlled by the sequential operation of the pump system 304 in a manner more easily understood after a description of the construction of the ventricle.

The ventricle 300, in one embodiment, is comprised of four flat pieces of flexible cloth or canvas imbibed and coated with a silicone rubber material of the type commonly used for prosthesis. Element 305 forms a central and common, flexible wall between an atrium pump chamber 320 (see FIG. 17) and the atrium 321 (see FIG. 16); and between the ventricle pump chamber 322 and the ventricle 323. The flexible pieces 324 and 325, respectively, are fastened to one side of wall 305 to form therewith the said ventricle pump chamber 322 and atrium pump chamber 320. The last flexible piece 306 is affixed to the other side of the wall 305 to form the atrium 321 and ventricle 323. Suitable one-way valve structures 307 and 308 assure blood flow as indicated by the arrows. All joints and connections between the pieces are thoroughly coated with the silicone rubberlike material.

In operation, then, the pump chambers 320 and 322 are interconnected through flexible tubes 325 and 326 with fluid reservoirs 327 and 328. These reservoirs are affixed beneath platens 329 and 330 and are arranged to be synchronously squeezed or at least partially collapsed by the cams 331 and 332, mounted on the motor-driven shaft 333. The reservoirs are filled with a liquid—such as water—in a quantity sufficient, upon the collapse or squeezing by the action of the platens 327 and 328 to fill or at least partially fill the pump chambers 320 or 322 to thereby squeeze or collapse the adjacent atrium 321 or ventricle 323, as the case may be, to thereby cause blood to flow as desired. As was true of the exterior apparatus described above it is essential the atrium 321 be of a size sufficient to accommodate incoming venous flow without restriction. Squeezing of the atrium must be timed in such a manner to assure uninterruption of the venous inflow. The degree of collapse or squeezing of the chambers 321 and 323 is controlled by the volume of liquid in the reservoirs. As was true of the artificial ventricle described above, the implantable one must be substantially flat in cross-section or at least in such a configuration or construction as will not allow tensive forces to be generated as might interrupt the continuous inflow to the atrium and pulsaile ouflow from the ventricle.

The relative size of the chambers 323 and 321 is, of course, variable. A maximum size for the ventricle chamber would be on the order of 100 cc. and for the atrium a maximum would be on the order of 40 cc. For an adult weighing upwards of 250 pounds, at 80 beats per minute this would amount to about 6,400 cc. per minute passed through the artificial ventricle. Because of the passive nature of my artificial ventricle construction it is important to know one can achieve any flow short of maximum capacity since flow rate is independent of the ventricle action. Of course, for a child of perhaps 30 pounds on the order of 1,000 cc. per minute of blood is circulated and one might wish a smaller construction.

Having thus described the invention in detail and with sufficient particuarity as to enable those skilled in the art to practice it, what is desired to have protected by Letters Patent is set forth in the following claims.

I claim:

1. A non-sucking, pulsatile outflow, continuous inflow artificial ventricle comprising the combination of:
   (i) a first distensible body forming a chamber substantially flat in cross-section when in repose,
      (a) means associated with the first body forming an inlet and an outlet;
   (ii) a second distensible body forming a second chamber substantially flat in cross-section when in repose and interconnected with the ventricle inlet;
   (iii) synchronous means arranged to cyclically operate the ventricle to provide a continuous and unobstructed inflow to the second chamber while assuring a pulsatile discharge from the outlet of the first chamber.

2. The non-sucking, pulsatile outflow, continuous inflow artificial ventricle of claim 1 comprising the combination of:
   (i) a first distensible body forming an elongated chamber substantially flat in cross-section when in repose, said body being comprised of a highly flexible interior tube loosely positioned intermediate its ends within a highly flexible inelastic cover member,
      (a) means associated with the first body forming an inlet and an outlet;
   (ii) a second distensible body forming a second chamber substantially flat in cross-section when in repose and interconnected with the ventricle inlet, and second body being comprised of a highly flexible interior tube loosely positioned intermediate its ends within a highly flexible inelastic cover member;
   (iii) synchronous means arranged to cyclically operate the ventricle to provide a continuous and unobstructed inflow to the second chamber while assusring a pulsatile discharge from the outlet of the first chamber.

3. In a pulsatile outflow, continuous inflow, artificial ventricle, the combination comprising:
   (a) a highly flexible distensible body forming a ventricle chamber, said distensible body being formed in such a manner as to allow body walls to distend when filled with blood without the generation of tensive reactive forces in the body walls, thereby preventing the formation of a suction force in the chamber;
   (b) means forming an inlet valve to the ventricle chamber and additional means forming an outlet valve from the ventricle chamber;
   (c) a highly flexible distensible body forming an atrium and having an inlet adapted for connection with a blood vessel of a subject, said distensible body being formed in such a manner as to allow body walls to distend when filled with blood without the generation of enstive reactive forces in the body walls;
   (d) said atrium further including an outlet interconnected with the inlet valve of said ventricle chamber;
   (e) means for constricting the ventricle chamber;
   (f) timing means cyclically operating the ventricle inlet and outlet valves and said constricting means in such a sequence as to produce a pulsatile discharge through said ventricle outlet while said atrium inlet continuously receives a flow of blood substantially independent of the operation of said timing means on the inlet and outlet valves of the ventricle.

4. The artificial ventricle of claim 3 further including:
   (g) a frame for supporting said ventricle in a substantially upright position so that said inlet valve is elevated relative to said outlet valve whereby the force required to distend the ventricle chamber is supplied by the pressure of blood flowing into the ventricle chamber from the atrium.

5. The artificial ventricle as set forth in claim 3 in which said atrium and said ventricle chamber are formed as sections of a common flexible tube, said inlet valve comprising a backing plate and a clamping bar means for clamping a portion of the tube to define on opposite sides the atrium and the ventricle chamber.

6. The combination as set forth in claim 5 in which said outlet valve comprises a backing plate and second clamping bar means for clamping a portion of the tube against the backing plate.

7. The artificial ventricle as set forth in claim 3 in which said atrium and said ventricle chamber are formed as sections of a common flexible tube, said inlet valve comprising first releasable clamping means engageable with the tube, and defining on opposite sides, the atrium and the ventricle chamber; said outlet valve comprising second releasable clamping means engageable with said tube at a place spaced from said first clamping means.

8. The artificial ventricle as set forth in claim 7 in which said first and second clamping means comprise a common backing plate, and independently movable clamping bars mounting for movement toward and away from said clamping plate.

9. The artificial ventricle as set forth in claim 8 in which said constricting means comprises a pumping plate movable to squeeze said tube against said backing plate between said valves.

10. The artificial ventricle as set forth in claim 3 in which said flexible bodies are formed as a common thin-walled rubber tube that is normally substantially flat, said inlet valve comprising clamping means engageable with said tube; and a reinforcing sleeve telescoped over said tube.

11. In a non-sucking pulsatile outflow, continuous inflow artificial ventricle: a frame; a highly flexible thin-walled tube having a normally substantially flat cross-section; said tube being formed in such a manner as to allow the wall of said tube to distend when filled with blood without the generation of tensive reactive forces in the tube wall, thereby preventing the formation of a suction force in the tube; fittings at opposite ends of the tube for establishing connections to conduits; bracket means carried by the frame for substantially suspending said tube so that one end is elevated relative to the other; a backing plate carried by said frame and extending alongside said tube in substantially parallel relationship to the flat side of said tube; a first clamping bar mounted by said frame adjacent the upper end of said tube and on that side of said tube remote from said backing plate, said first clamping bar being movable toward and away from said plate with said tube interposed therebetween for closing and opening said tube; a second clamping bar mounted by said frame adjacent the lower end of said tube and on that side of said tube remote from said backing plate, said second clamping bar being movable toward and away from said plate with said tube interposed therebetween for closing and opening said tube; said clamping bars being spaced from the ends of said tube and being spaced from each other to define therebetween a ventricle chamber, that portion of the tube between the first clamping bar and said upper end forming a distensible atrium; a pumping plate mounted by said frame on that side of said tube remote from said backing plate, said pumping plate being movable toward and away from said plate with said tube interposed therebetween for expressing fluid from said ventricle chamber; and timing means cyclically operating said clamping bars and said pumping plate in sequence to produce pulsatile discharge through the lower end of said tube while said atrium allows continuous inflow to said tube independent of the operation of the timing means and the pulsatile discharge from the ventricle chamber.

12. The artificial ventricle as set forth in claim 11 together with a common cam shaft; cams for said clamping bars and said pumping plate for causing said first clamping bar and said pumping plate to be retracted while said second clamping bar is advanced, said first clamping bar to be advanced while said second clamping bar is retracted, and said pumping plate to be advanced while said first clamping bar is advanced and said second clamping bar retracted; and means for rotating said cam shaft at a selected pulsatile rate.

13. The artificial ventricle of claim 1 in which the first and second distensible bodies and at least a portion of the synchronous means have all interior and exterior exposed surfaces of a material susceptible of implantation within the body.

14. The artificial ventricle of claim 3 in which the first and second distensible bodies and at least a portion of the synchronous means have all interior and exterior exposed surfaces of a material susceptible of implantation within the body.

15. The artificial ventricle of claim 3 in which the timing means further includes means to at least partially constrict said atrium without interrupting continuous inflow of blood thereto.

References Cited

UNITED STATES PATENTS

| | | | |
|---|---|---|---|
| 2,105,200 | 1/1938 | Phelps | 103—148 |
| 2,412,397 | 12/1946 | Harper | 103—148 |
| 2,689,530 | 9/1954 | Harvey | 103—148 |
| 2,917,751 | 12/1959 | Fry et al. | 3—1 |
| 2,922,379 | 1/1960 | Schultz | 103—148 |
| 3,007,416 | 11/1961 | Childs. | |
| 3,097,366 | 7/1963 | Winchell | 3—1 |
| 3,180,272 | 4/1965 | Broadfoot | 103—149 |
| 3,359,910 | 12/1967 | Latham | 103—149 |

FOREIGN PATENTS 669,809  4/1952  Great Britain.

DONLEY J. STOCKING, Primary Examiner

W. J. GOODLIN, Assistant Examiner

U.S. Cl. X.R.

3—1; 23—258.5; 128—1